United States Patent [19]

Goff

[11] Patent Number: 4,918,584
[45] Date of Patent: Apr. 17, 1990

[54] SELF-ADJUSTING SERVO DEVICE AND METHOD

[75] Inventor: Kenneth W. Goff, Abington, Pa.

[73] Assignee: Performance Controls, Inc., Horhsam, Pa.

[21] Appl. No.: 216,533

[22] Filed: Jul. 8, 1988

[51] Int. Cl.⁴ .................... G05B 13/00; G05F 1/00
[52] U.S. Cl. .................... 364/177; 364/161; 364/165; 318/621; 318/561
[58] Field of Search .............. 364/148, 161, 165, 176, 364/177, 179; 318/561, 609, 621, 636

[56] References Cited

U.S. PATENT DOCUMENTS

| | | | |
|---|---|---|---|
| 3,221,238 | 11/1965 | Unger | 318/489 |
| 3,594,557 | 7/1971 | Anderson | 235/151.1 |
| 3,644,719 | 2/1972 | Rouxel et al. | 364/177 |
| 3,798,426 | 3/1974 | Bristol, II | 364/177 |
| 3,864,554 | 2/1975 | Chevalier | 235/150.1 |
| 4,052,642 | 10/1977 | Speth et al. | 364/177 |
| 4,054,780 | 10/1977 | Bartley | 364/106 |
| 4,093,904 | 6/1978 | Burig | 318/616 |
| 4,168,457 | 9/1979 | Rose | 318/561 |
| 4,345,194 | 8/1982 | Green | 318/621 |
| 4,386,407 | 5/1983 | Hungerford | 364/177 |
| 4,430,698 | 2/1984 | Harris | 364/161 |
| 4,533,991 | 8/1985 | Georgis | 364/164 |
| 4,546,426 | 10/1985 | Häfner | 364/153 |
| 4,577,271 | 3/1986 | Jones | 364/174 |
| 4,602,326 | 7/1986 | Kraus | 364/158 |
| 4,609,855 | 9/1986 | Andrews | 318/561 |
| 4,612,489 | 9/1986 | Gunda | 318/621 |
| 4,622,504 | 11/1986 | Yamazaki | 318/561 |
| 4,634,946 | 1/1987 | Moulds | 318/561 |
| 4,675,804 | 6/1987 | Wiemer | 364/161 |
| 4,697,127 | 9/1987 | Stich | 318/561 |

Primary Examiner—John R. Lastova
Attorney, Agent, or Firm—William H. Eilberg

[57] ABSTRACT

This invention is a method and apparatus for automatically adjusting the command signal of a servomechanism, to improve the accuracy of control over the motion of an object. In one embodiment, the command signal is advanced in time, to compensate for the delayed response of the servo. The time advance is repeatedly and automatically adjusted so as to minimize the magnitude of the tracking error. Each adjustment of the time advance is based on the value of a sampled error signal, taken at selected points in time. Other parameters of the command signal, such as the amplitude and average level, can also be adjusted, and the adjustments for all parameters can be done simultaneously. For a given parameter, the error signal is sampled at those points at which misadjustment of that parameter is most likely to contribute to the error of the system. Thus, in general, different parameters of the command signal are adjusted based on different sets of sampled points of the signal. The adjustment of one parameter can therefore be done without interfering with the adjustment of the others.

21 Claims, 7 Drawing Sheets

SELF-ADJUSTING SERVO DEVICE AND METHOD

BACKGROUND OF THE INVENTION

This invention relates to the field of motion control, and, in particular, discloses an improved servomechanism having exceptional accuracy.

The purpose of any servomechanism is to move an object according to a command signal. The motion may be rotational or linear. In servomechanisms of the prior art, the motion of the object does not exactly follow the waveform of the command signal. The most obvious source of error is time lag; the object cannot move instantaneously to the position required by the command signal.

Certain applications demand a servomechanism having great accuracy. One example of such an application is the control of the position of the tool in a special lathe for making shaped metal parts. Unless the servomechanism responds accurately to the command signal, the contour of the part will not be formed exactly as desired, and the part may thus be partially or totally defective. This invention is not limited to machine tool applications, however, but can be used in many other contexts.

It has been known, in the prior art, to compensate for the inherent time lag in a servomechanism by advancing the waveform of the command signal by a known small amount, the amount being sufficient to place the object in the desired position at the desired time. However, this prior art method is not satisfactory for high-precision applications, because the amount of time lag required varies due to changes in variables such as temperature and the friction of mechanical components. Even a relatively small error in the setting of a time lag value can cause unacceptably large tracking errors in the system.

Other errors can prevent a perfect match between the command signal and the response of the servomechanism. Imperfections in the system can cause differences in the amplitude of the command and response signals. Also, the servomechanism may introduce a bias, or offset, to the command signal, which bias causes errors in the positioning of the object.

The present invention provides a method and apparatus for automatically adjusting the command signal to minimize errors in tracking. The invention has general applicability to the adjustment of various parameters of the command signal, such as time advance, amplitude, offset, and others. The invention provides a means whereby a plurality of such parameters may be sampled and adjusted virtually simultaneously, wherein the adjustment of one parameter does not interfere with the adjustment of another. The invention thereby provides a servomechanism having an extremely close correspondence between the command and position signals.

SUMMARY OF THE INVENTION

The present invention is an apparatus and method for repeatedly and virtually instantaneously varying a parameter of the command signal of a servomechanism, so as to minimize the magnitude of the tracking error. The term "tracking error", as used herein, means the algebraic difference between the command signal and the "position signal", i.e. the signal indicative of the position of the object being controlled.

In one embodiment, the parameter being adjusted is the amount of time advance of the command signal. The system of the invention samples the command signal and the position signal, at seleced portions of the waveform of the command signal, and generates an error signal, the magnitude of which must be minimized. The system then modifies the polarity of the sampled error signal in a manner to be described below. The modified error signal is then integrated, and the output of the integrator is added to the previously calculated value of the time advance. The system uses the new value of time advance to adjust the command signal.

It turns out that the error due to time advance tends to be greatest when the waveform of the command signal is changing most rapidly. The apparatus therefore samples the error signal only at or near the points of maximum slope of the waveform of the command signal.

When the parameter being adjusted is time advance, the polarity of the sampled error signal must be inverted for those points at which the slope of the command signal is positive. This inversion is necessary to insure that the correction in the time advance parameter reduces the magnitude of the error signal. The sampled error signal must not be inverted for those points at which the slope of the command signal is negative.

The same technique is used to adjust other parameters of the waveform, such as its amplitude or its average level, or offset. With each such parameter, there is, in general, a different set of points of the command signal waveform at which the error signal should be preferably sampled. By sampling at the preferred points, the system maximizes the efficiency of the adjustment of a given parameter. Also, for each parameter, there is, in general, a different profile of polarity adjustments required to assure that the correction to the parameter does, in fact, reduce the magnitude of the error signal.

The system can calculate adjustments for a set of parameters simultaneously, and in parallel. The calculation of the correction of one parameter does not interfere with the similar calculation being done for one or more of the other parameters.

In many applications, the command signal is a digitally stored waveform, so it is easy to sample it at predetermined times. But it is also possible to sample the signal not at predetermined moments, but in response to actual measurements of the command signal. For example, one can sample the command signal at points of maximum or minimum slope, or near those points at which the command signal equals its average value.

It is therefore an object of the invention to provide a servomechanism which tracks a command signal with great accuracy.

It is another object of the invention to provide an apparatus for adjusting the command signal of a servomechanism to compensate for errors in the system.

It is another object to provide an apparatus which is capable of repeatedly and simultaneously adjusting a plurality of parameters of the command signal of a servomechanism, to compensate for errors in the system.

It is another object to provide a method of adjusting a command signal in a servomechanism, so as to improve the tracking accuracy.

Other objects and advantages of the invention will be apparent to those skilled in the art, from a reading of the following brief description of the drawings, the detailed description of the invention, and the appended claims.

DETAILED DESCRIPTION OF THE INVENTION

Figure 1:
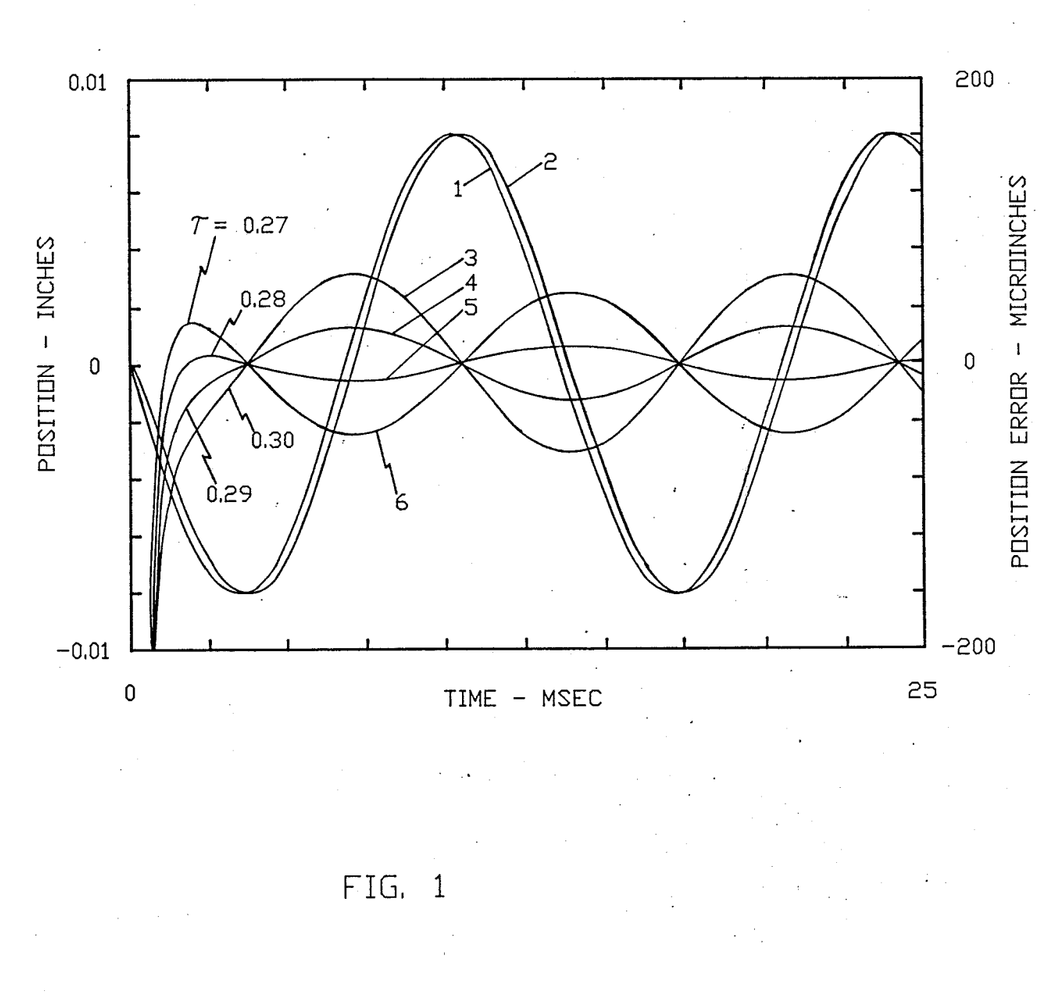
FIG. 1 is a graph showing the position command signal and the measured position signal of a servomechanism, without amplitude or delay compensation. Also shown is the difference between these signals (i.e. the error signal) for selected values of delay compensation.

FIG. 1 is a graph which illustrates the operation of a servomechanism, and which also illustrates the problem solved by the present invention. Curve 1 is the command signal, i.e. the waveform representing the desired motion of the controlled object. The position scale is in inches; the error scale is in millionths of an inch. The time scale is in milliseconds. Curve 2 is the measured position signal, i.e. the waveform indicative of the actual position of the object. The command signal must lead the position signal, due to the inherent delay in obtaining a physical response to an electronic command. FIg. 1 depicts a theoretical case in which the amplitudes of the command and measured position signals are equal, so that there is no need to correct amplitude errors.

In the prior art, it has been known to shift the command signal in time, to compensate for the lag described above. FIG. 1 shows the error signal, i.e. the difference between the command and position signals, for various amounts of such time shifts. The parameter $\tau$ represents the amount by which the time of the command signal is advanced. Curves 3, 4, 5, and 6 represent the error signal for four different values of $\tau$. Although the error signals in FIG. 1 summarize the effects of introducing time advance, it is noted that curve 1 represents the command signal before any time advance has been introduced.

In the case of FIG. 1, it is assumed that the amplitudes of the command and position signals are equal. In this special case, there is an optimum value of $\tau$ which makes the magnitude of the error zero.

From FIG. 1, one can see that the magnitude of the tracking error due to a non-optimal value of the time advance $\tau$ is greatest at those points where the command signal is changing most rapidly. The magnitude of the error is least when the command signal is at an extremum.

From analysis of FIG. 1, one can devise a method of adjusting $\tau$ to minimize the magnitude of the error. Suppose, for example, that the slope of the command signal is positive. Then the magnitude, i.e. the absolute value, of the error is reduced by adjusting $\tau$ in the direction indicated by the inverted sign of the error. That is, where the error is positive, the error is reduced by decreasing $\tau$. Where the error is negative, the magnitude of the error is reduced by increasing $\tau$.

Where the slope of the command signal is negative, the same kind of analysis applies. In this case, the magnitude of the error is reduced by adjusting $\tau$ in the direction indicated by the uninverted sign of the error. Where the error is positive, $\tau$ is increased, and where the where the error is negative, $\tau$ is decreased.

In many applications, the command signal is stored, in digital form, in a table. It is therefore comparatively easy to vary the amount of time advance, by moving to a later value from the table. In other applications, where the command signal is not stored in a table, some other form of time advance would be needed.

Figure 2:
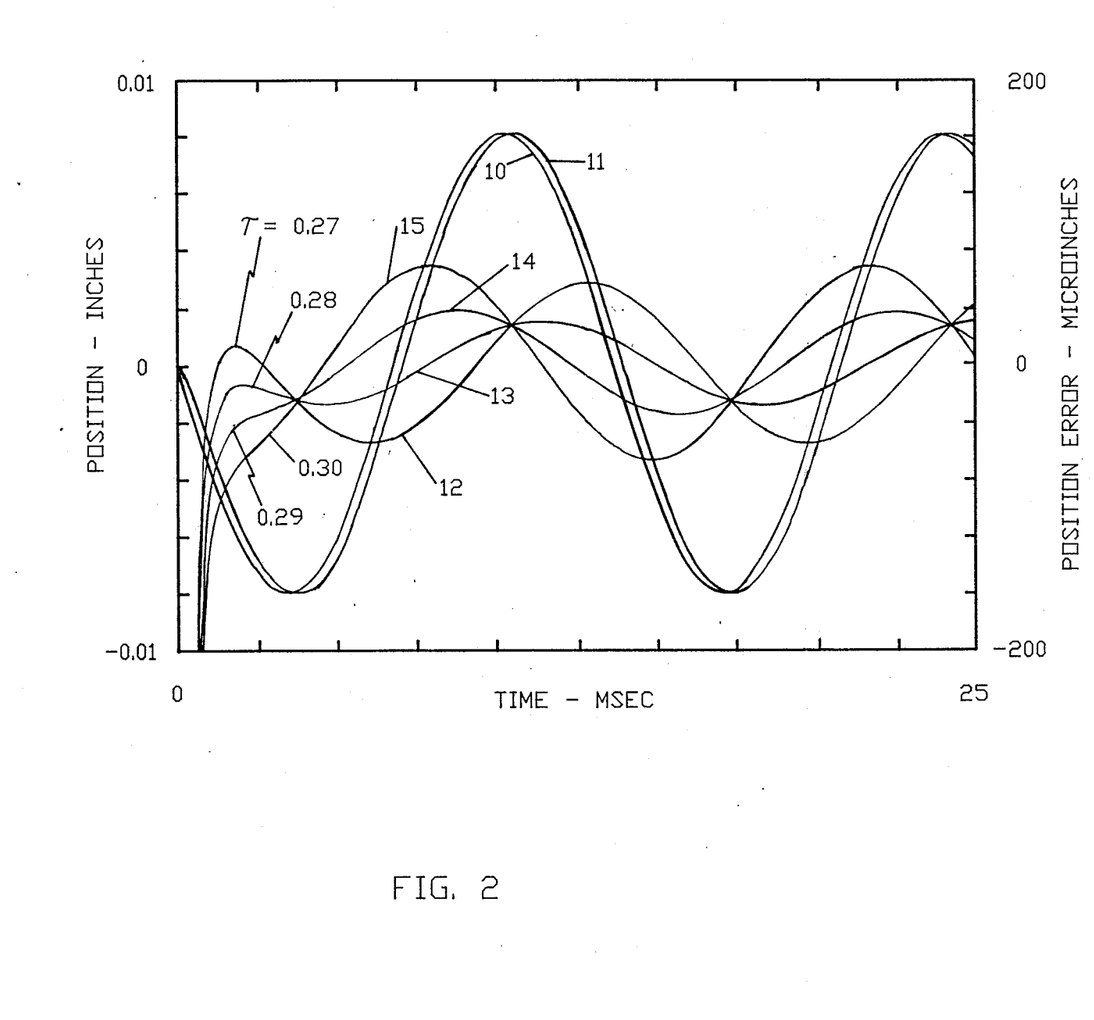
FIG. 2 is a graph similar to FIG. 1, with some amplitude error, and selected values of delay compensation.

FIG. 2 is similar to FIG. 1, except that FIG. 2 also shows the effect of an amplitude error, i.e. a difference between the amplitudes of the command and position signals. Curve 10 represents the command signal, and curve 11 represents the measured position. Curves 12, 13, 14, and 15 are the error signals for $\tau=0.27$ ms, $\tau=0.28$ ms, $\tau=0.29$, and $\tau=0.30$ ms, respectively. The same kind of analysis, discussed with respect to FIG. 1, applies to FIG. 2. That is, the parameter $\tau$ can be adjusted in the same way to reduce the position error.

In general, when the servomechanism has an uncorrected amplitude error, there is no value of $\tau$ which will insure perfect tracking, even in theory. FIG. 2 illustrates this principle by showing the error signal for several values of $\tau$.

Figure 3:
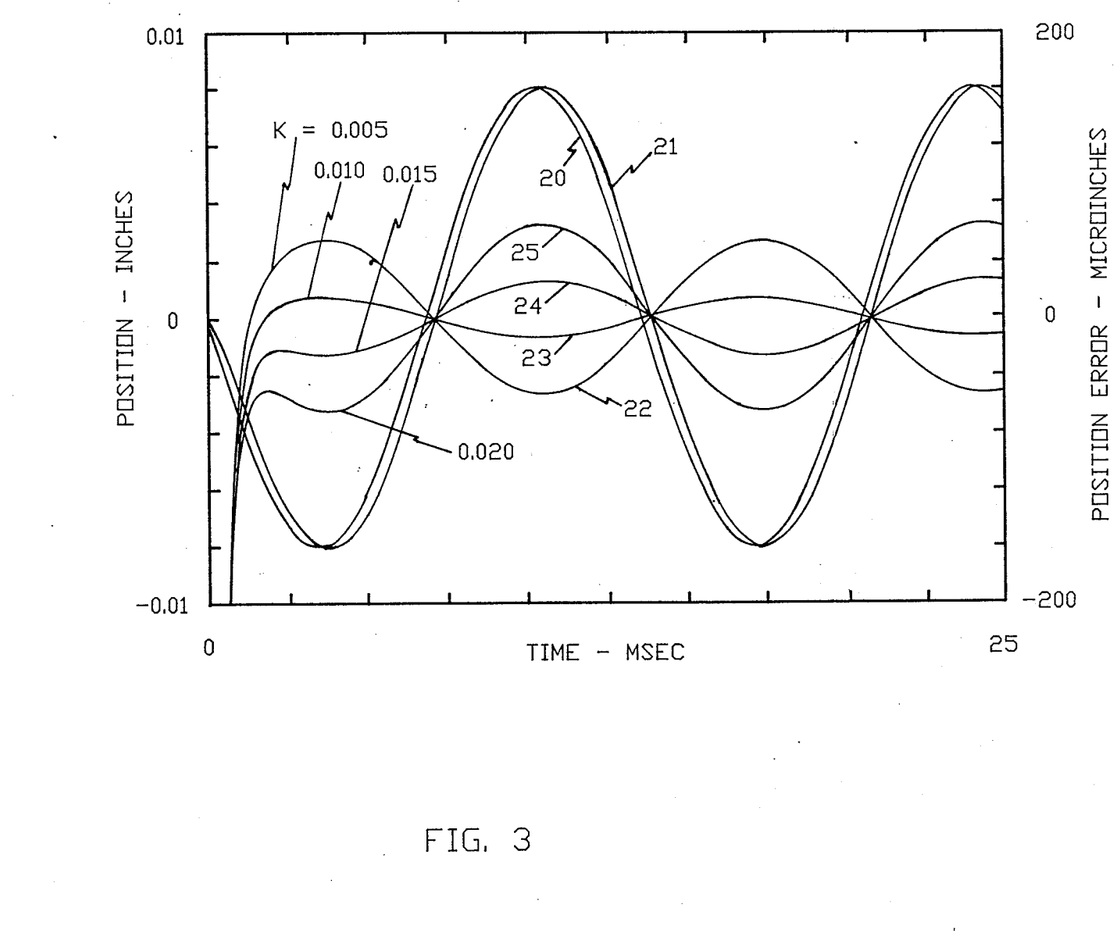
FIG. 3 is a graph similar to FIGS. 1 and 2, with perfect delay compensation and selected values of amplitude compensation.

FIG. 3 shows the effects of adjusting the amplitude of the command signal to compensate for errors in the system. Curve 20 is the command signal, before adjustment, and curve 21 is the position signal. The amplitude correction is made by multiplying the command signal by $(1+k)$. The error signals are plotted for four values of k. In particular, error curves 22, 23, 24, and 25 correspond to $k=0.005$, 0.010, 0.015, and 0.020, respectively. FIG. 3 shows that the error due to amplitude errors is greatest where the waveform is at an extremum, and is least where the waveform is changing most rapidly. In FIG. 3, the value of the time advance $\tau$ is optimal; that is, in FIG. 3, the only errors are due to errors in amplitude.

In adjusting the amplitude of the command signal, it is also necessary to compensate for changes in the average level of that signal. If the average level is nonzero, multiplication by the factor $(1+k)$ will introduce a new error into the command signal. It is therefore necessary to subtract an average value before multiplying by $(1+k)$, and then to add back the average value.

From FIG. 3, one can also devise a method of adjusting the parameter k, similar to that described for $\tau$, above. For example, where the command signal is at a minimum, the error is reduced by adjusting k in the same direction indicated by the sign of the error signal. Thus, when the error signal is positive, the error is reduced by increasing k. When the error signal is negative, the magnitude of the error is reduced by decreasing k.

Where the command signal is at a maximum, the error is reduced by adjusting k in the opposite direction indicated by the sign of the error signal. In this case, when the error signal is positive, the error is reduced by decreasing k, and when the error signal is negative, the magnitude of the error is reduced by increasing k.

Figure 4:
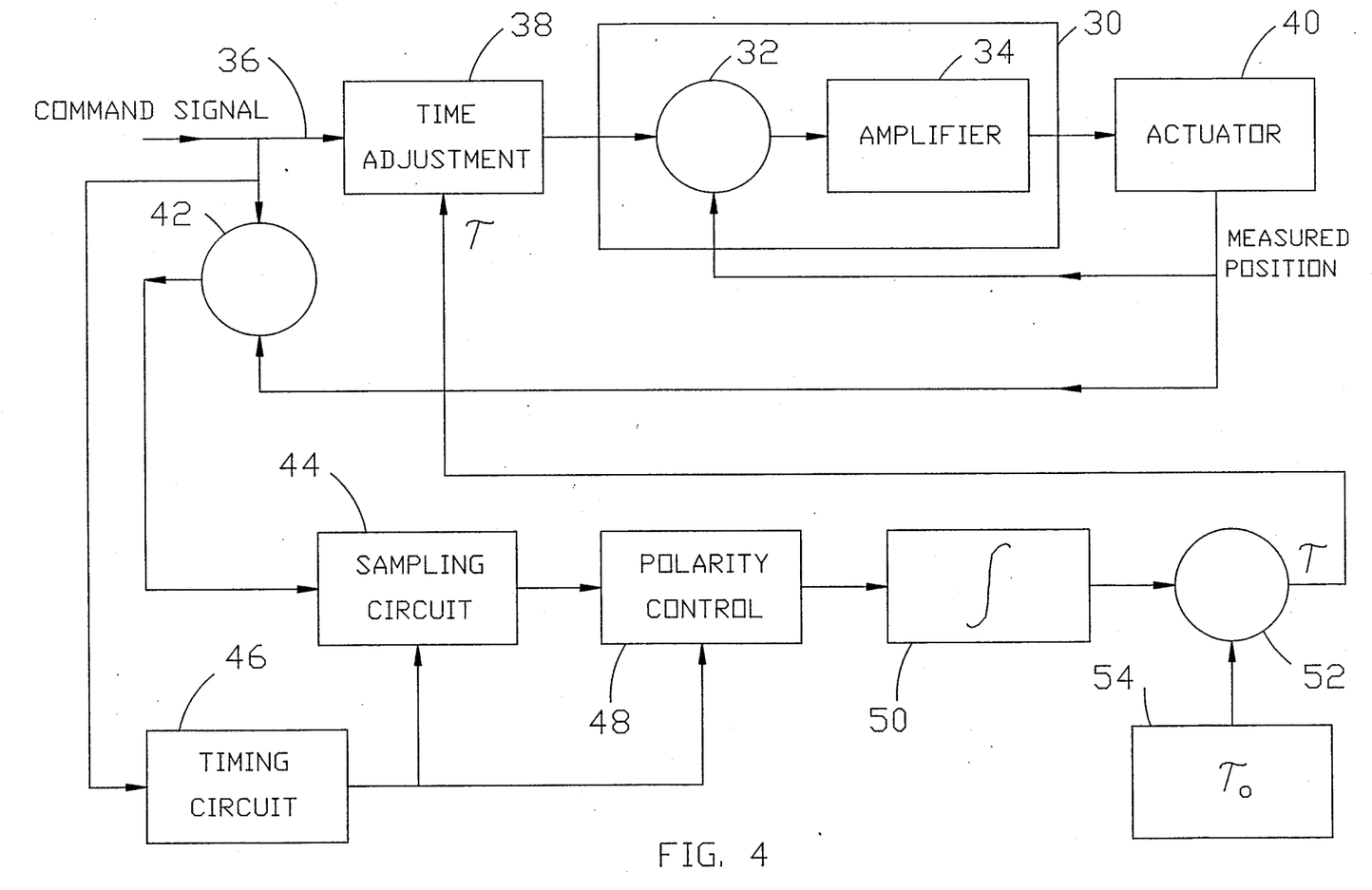
FIG. 4 is a block diagram of one embodiment of the present invention, capable of adjusting a single parameter of the command signal.

FIG. 4 is a block diagram of one embodiment of the invention which implements the method discussed above, for minimizing the magnitude of the tracking error of a servomechanism. In FIG. 4, servo unit 30 includes adder 32 and amplifier 34. The servo unit drives actuator 40, which may generate either linear or rotational motion. It is understood that the servo unit can be any conventional servo system. The servomechanism itself, i.e. the components within block 30, and the actuator, do not form part of the invention.

The command signal enters the circuit at line 36. Time adjustment circuit 38 introduces a predetermined amount of time advance into the command signal.

Comparator 42 generates an error signal, i.e. a signal representing the algebraic difference between the command signal and the actual position of the object being controlled. This error signal is sampled by sampling circuit 44. Circuit 44 is preferably a "sample and hold" device, which records the value of the input signal at a given instant and holds that value for a longer period. Timing circuit 46 determines when the sampling circuit reads the output of comparator 42, and therefore determines what parts of the command signal waveform are sampled. Circuit 48 adjusts the polarity of the output of the sampling circuit. The output of the sampling circuit is either inverted or uninverted. The signal is then integrated in integrator 50. The output of the integrator is added to a predetermined value $\tau_o$ in adder 52, and the result is connected to time adjustment circuit 38. The value of the output of adder 52 therefore determines the amount of time advance caused by circuit 38.

The timing circuit 46 controls the time at which sampling circuit 44 operates, and also determines whether circuit 48 inverts its input or allows that input to pass through unaltered. Since the parameter being adjusted is the time advance $\tau$, and since FIGS. 1 and 2 show that a correction to $\tau$ is most effective where the command signal is changing most rapidly, the timing circuit can be programmed to enable the sampling circuit only at those points in the command signal waveform. In cases where the command signal is known in advance, the points at which the signal is most rapidly changing are also known in advance. In an alternative embodiment, the timing circuit includes a circuit for sensing when the first derivative of the command signal has just passed through a maximum, and for enabling the sampling circuit immediately after detecting the latter condition. In still another alternative embodiment, the timing circuit includes a circuit which senses when the position command equals its average value, and enables the sampling circuit immediately thereafter.

The polarity control circuit 48 assures that the polarity of the sampled error signal, which is to be integrated, will change $\tau$ in a direction such that the magnitude of the error signal is minimized. As is apparent from FIGS. 1 and 2, the polarity of the output of circuit 44 needs to be inverted when the slope of the command signal is positive, but should not be inverted when the slope of the command signal is negative. For example, in FIG. 2, where the slope of the command signal is positive, and where the error is positive, one can reduce the magnitude of the error by reducing $\tau$. Where the error is negative, one can reduce the magnitude of the error by increasing $\tau$. The same kind of analysis can be applied for the points where the slope of the command signal is negative.

Polarity control circuit 48 is shown to receive input from timing circuit 46, because the polarity adjustment depends on the instantaneous slope of the command signal. And, as explained above, the value of the slope is obtained by timing circuit 46, either by direct measurement, or by interpretation of previously stored information about the waveform of the command signal.

The output of circuit 48 therefore comprises a series of corrections to the value of $\tau$. Integrator 50 adds and smooths these corrections, and the output of the integrator is combined with a predetermined starting value $\tau_o$ to yield a corrected value of $\tau$. The latter value controls time adjustment circuit 38, to determine the amount of time advance.

The value of $\tau_o$ may be stored in non-volatile memory, symbolically indicated by block 54, and may be based on a reasonable estimate of the time advance needed in most servo systems. Alternatively, the value of $\tau_o$ may be the last value of $\tau$ computed and stored in a previous "run" of the system. The latter alternative is especially useful if one is doing several runs in sequence. Normally, the last calculated value of $\tau$ will most accurately reflect the most recent changes in temperature, friction, etc. The storage means 54 may therefore include means for storing the most recently calculated value of $\tau$, for later use as $\tau_o$.

Another scheme for setting $\tau_o$ is to use a different set of values for different runs, depending on the operating conditions for each run. The value of $\tau_o$ may vary depending on the load on the actuator at a particular moment. Block 54 can therefore represent a memory device which supplies different starting values of $\tau_o$ at different times.

Figure 5:
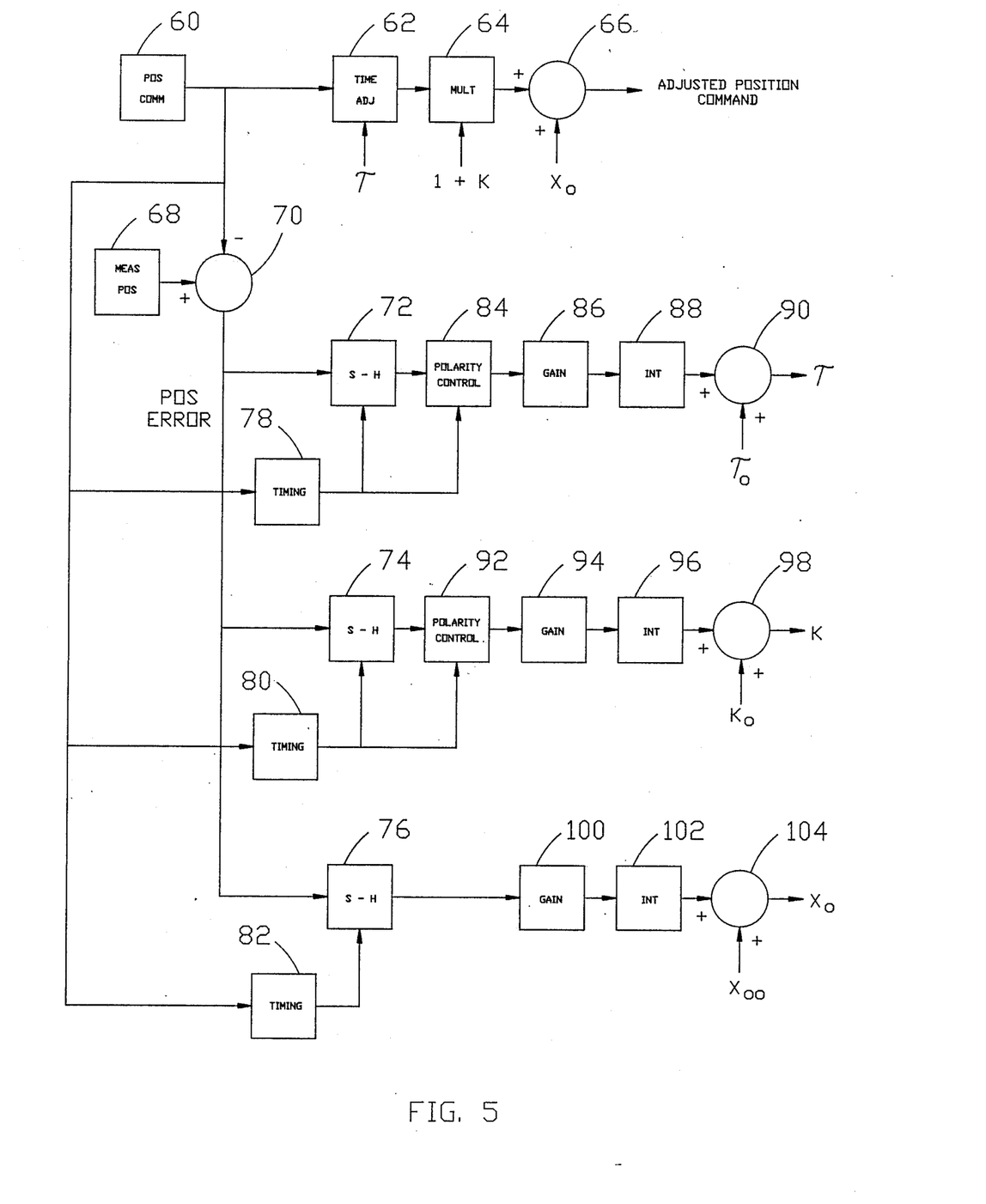
FIG. 5 is a block diagram of another embodiment of the present invention, wherein three distinct parameters of the command signal are automatically adjusted.

FIG. 5 is a block diagram showing an embodiment of the invention wherein the system adjusts there different parameters of the command signal. These parameters are the time advance, the amplitude, and the average level, or offset, of the waveform. For the sake of simplicity, the components corresponding to block 30, in FIG. 4, are omitted in FIG. 5.

The position command signal originates in block 60, the signal being generated either by reference to a stored table, by calculation, or by other means. As indicated symbolically, "position" can mean either linear or angular position. The command signal is adjusted in the three blocks 62, 64, and 66. Block 62 is a time adjustment circuit, similar to circuit 38 of FIG. 4, and provides the amount of time advance designated by $\tau$. Block 64 simply multiplies the command signal by $(1+k)$, where k is the amplitude correction, discussed above. Adder 66 combines the command signal with offset correction $x_o$, to be discussed below.

As shown in FIG. 5, the corrections for time advance, amplitude, and offset are determined independently, and in parallel. The command signal is compared with the measured position signal (coming from block 68), in comparator 70, and the output of the comparator, i.e. the error signal, is connected to the inputs of sampling circuits 72, 74, and 76. The sampling circuits are all similar to circuit 44 of FIG. 4, and are connected to timing circuits 78, 80, and 82. The timing circuits are similar to circuit 46 of FIG. 4; they enable the sampling circuits at selected times.

The output of sampling circuit 72 is connected to polarity control circuit 84, which is similar to circuit 48 of FIG. 4. The output of circuit 84 is integrated in block 88, after having been multiplied by a predetermined gain factor in block 86. The gain factor is an adjustment which determines the speed with which the adjusted parameters converge on their proper values. The larger the gain, the more rapid the convergence. However, the rapid convergence is associated with more severe swings in the error value, and with more noise. The gain factor should thus be made adjustable, but the adjustment is not critical, and the gain factor would not need to be adjusted frequently.

The integrated signal is added to the starting value $\tau_o$ of the time advance, in adder 90, which is similar to element 52 of FIG. 4. The result is fed to circuit 62 to determine the amount of time advance.

The signal which is sampled in circuit 74 also passes through a polarity control circuit, designated as block 92. The polarity control circuit and sampling circuits are connected to timing circuit 80. As in the case of the time advance, the resulting signal is fed to a gain adjusting circuit (block 94), an integrator (block 96), and an adder (block 98). After 98 combines the integrated signal with a stored starting value $k_o$ for the amplitude correction. The starting value may be stored in the same manner described for the starting value of the time advance, discussed with reference to FIG. 4. For the sake of simplicity, no storage means, similar to block 54 of FIG. 4, are shown in FIG. 5, but it is understood that such circuitry can be used if needed.

The treatment of the offset correction is similar, but not identical, to that of the other parameters. Sampling circuit 76 is controlled by timing circuit 82, and the output is multiplied by a desired gain factor, in block 100, integrated in block 102, and added to a starting value in adder 104. The starting value of the offset may be stored in the same way described with respect to the starting values of the other parameters.

There is no polarity control circuit in the adjustment of the offset. The reason is that the polarity of the offset correction is always the same. Whenever there is a nonzero error signal, which is not due to misadjustment of other parameters such as time advance or amplitude, the error is likely to be due to an offset error. The system therefore compensates for this error by adjusting the offset of the command signal. More particularly, the system corrects the offset by adding the inverted error signal to the command signal. The offset error may be sampled at any point on the waveform, and the sign of the error, at each point, is always inverted.

Figure 6:
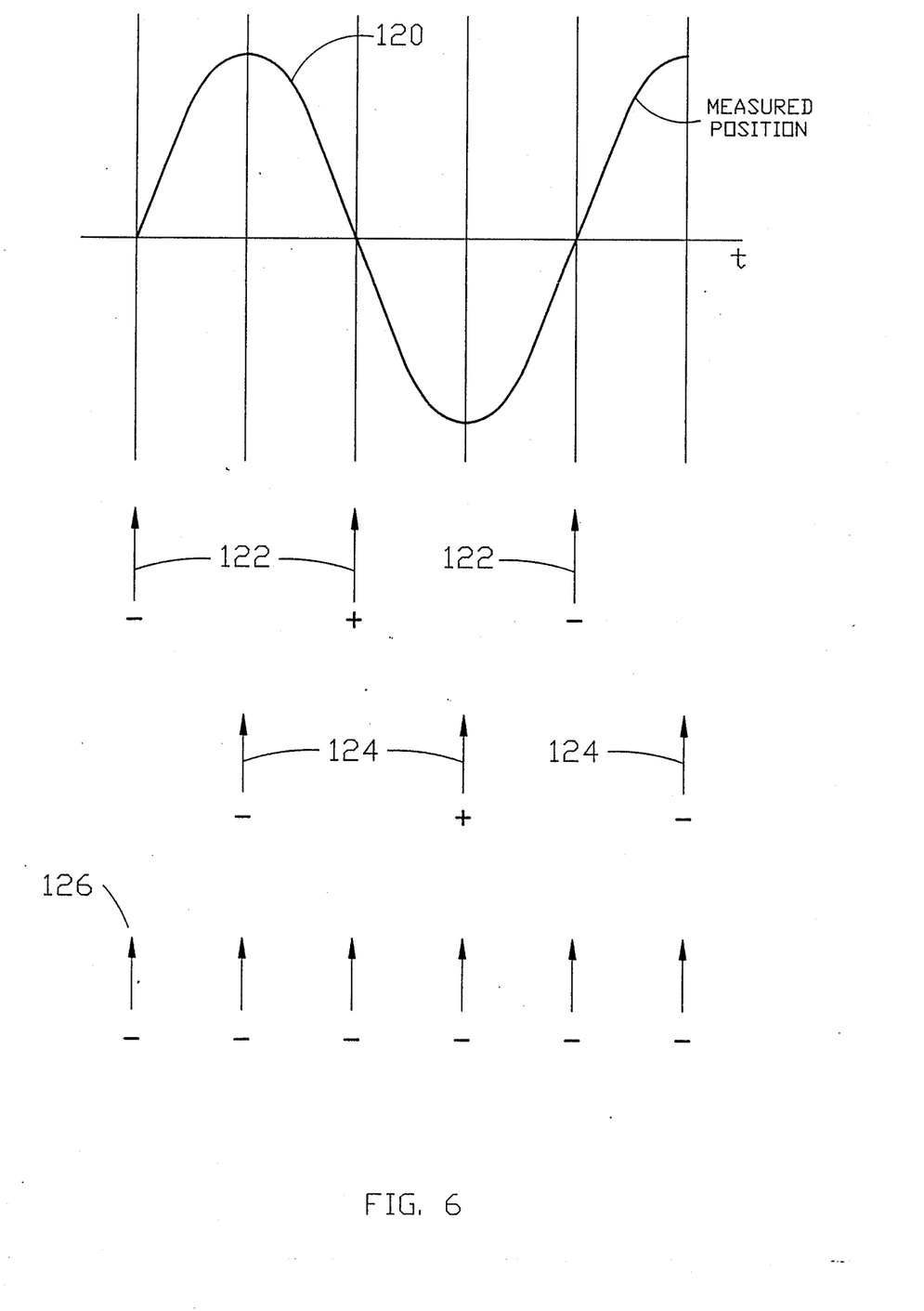
FIG. 6 is a diagram indicating how the polarity of the error signal is modified, to insure hat the parameters of the command signal will converge towards their correct values.

FIG. 6 is a diagram which summarizes the sampling and polarity control of the the present invention. Sine wave 120 represents a command signal. Arrows 122 indicate the points on the command signal at which the latter signal is sampled for correction of time advance. Arrows 124 and 126 indicate the sampling points for the amplitude and offset corrections, respectively. The plus and minus signs indicate whether the polarity of the sampled signal needs to be inverted or kept constant. Thus, for example, in the case of the amplitude correction, the sampled signal taken when the command signal is at a maximum is inverted, and the signal taken at the minimum is not inverted. The command signal need not, of course, be sinusoidal, but it must be time-varying for the time advance and amplitude parameters to be meaningful.

The timing circuits can also be programmed to take into account special requirements of a particular application. For example, it may be desirable to disable the sampling circuit when the load on the actuator is changing abruptly. Thus, if there are segments where the lathe is not cutting, adjustment for average error would be suspended entirely, and adjustment for amplitude errors would be suspended over the non-cutting segments. In many applications, it is known in advance where the abrupt changes in the command signal will occur.

It may also be necessary to disable the sampling circuits when the waveform of the command signal approaches a constant value. As stated above, the concepts of time advance and amplitude have no meaning when the waveform is not time-varying. The timing circuits can therefore be programmed to suspend the adjustment of these parameters while the command signal is relatively constant, and to resume adjustment when significant variations resume.

The invention can be implemented in either analog or digital form. In the digital implementation, the adjusted position command, which is a digital signal, is fed to a digital-to-analog converter, the output of which is amplified and used to drive the actuator position control loop. The measured position of the object is detected by either an analog or digital encoder, of conventional design, which supplies a measurement of position for processing by the position control loop, and for calculation of position error for the adaptive functions. The digital implementation is often advantageous in that it is possible to store a large number of different command signals in tabular form, in a nonvolatile memory. In those cases where the command signal is much simpler, the analog implementation may be preferable because it eliminates the need for conversion between analog and digital formats.

Figure 7:
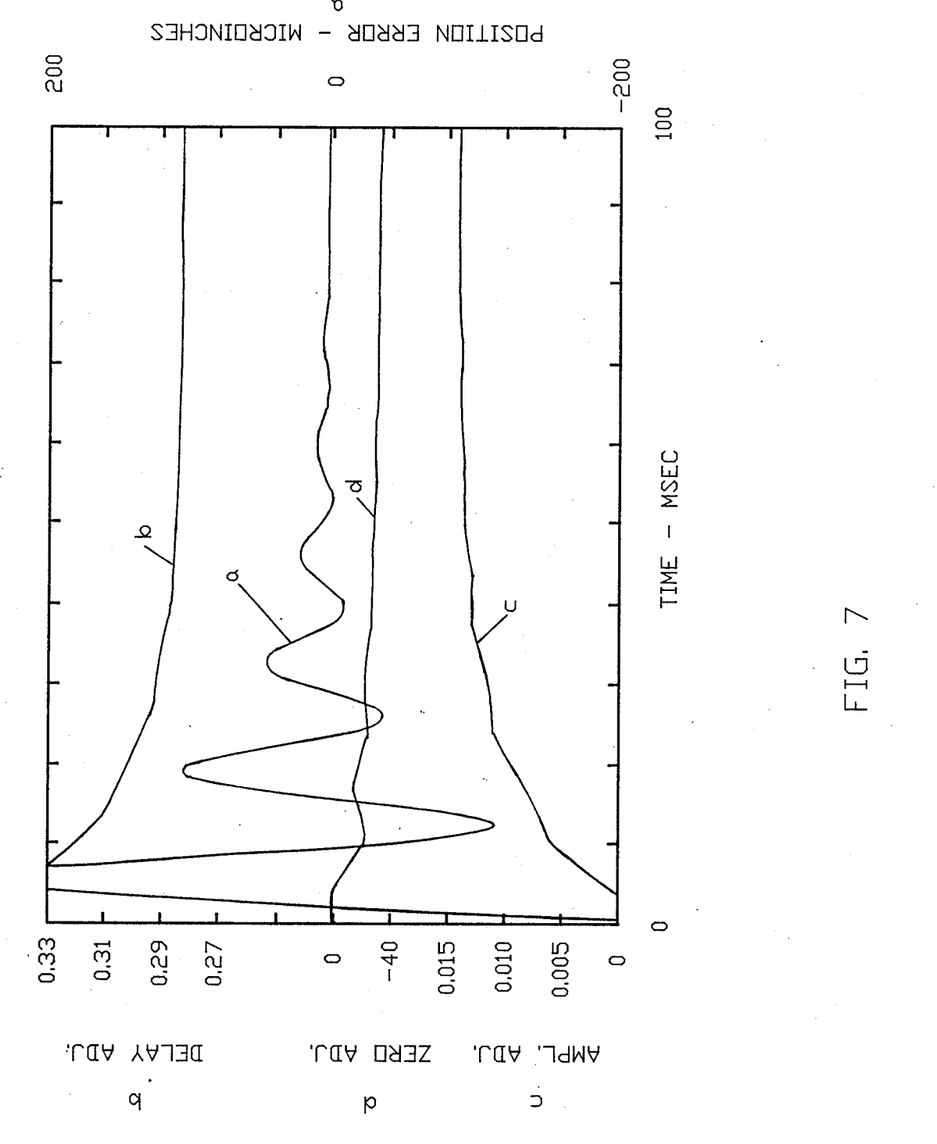
FIG. 7 is a graph showing the performance of a circuit made according to the present invention.

FIG. 7 is a graph which illustrates the performance of the present invention in moving an actuator to a desired final position. Curve a shows the error signal, described above, as a function of time. The scale of the error is shown at the left, in microinches, and the time is shown in milliseconds. Curve b represents the time advance parameter $\tau$, which was intentionally set at an incorrect initial value. The curve shows that the value of $\tau$ converges quite rapidly to the correct value.

Curve c represents the amplitude correction parameter k, described above. It, too, converges rapidly to the correct value. Curve d represents the offset correction. The values of the time advance, amplitude, and offset parameters are all shown on the left-hand portion of the graph.

While the invention has been described with respect to two particular embodiments, it is understood that other variations are possible. For example, it may be desirable to adjust other parameters of the command signal, or to adjust other combinations of such parameters. The particular means by which the sampling, integration, etc. of the signals are done may be varied. As mentioned above, the adjustment of parameters may be interrupted when the load on the moving object is changing very rapidly, or when the command signal becomes non time varying. These and other modifications should be deemed within the spirit and scope of the following claims.

What is claimed is:

1. In a servomechanism, the servomechanism being connected to control the position of a movable object, the servomechanism being controlled by a command signal, the servomechanism including means for generating a position signal indicative of the measured position of the object, the improvement comprising:
    (a) means for sampling the command signal and the position signal at a plurality of points in time,
    (b) means for generating an error signal proportional to the difference between the command signal and the position signal, at each of said points in time, the generating means being connected to the sampling means, (c) means for selectively altering the polarity of the signal produced by the generating means, the polarity being altered according to the point in time at which the signal is sampled, (d) means for integrating the signals produced by the polarity altering means, and (e) means for varying a selected parameter of the command signal, in response to the output of the integrating means, the varying means being connected to the integrating means, the varying means being capable of changing the parameter such that the magnitude of the error signal from the generating means tends to decrease.

2. The improvement of claim 1, wherein the selected parameter is the time advance of the command signal.

3. The improvement of claim 1, wherein the selected parameter is the amplitude of the command signal.

4. The improvement of claim 1, wherein the selected parameter is the average level of the command signal.

5. The improvement of claim 1, further comprising means for adding the output of the integrating means to a stored initial value of a correction to the selected parameter, the output of the adding means being connected to the varying means.

6. The improvement of claim 1, wherein the sampling means, the polarity altering means, the integrating means, and the varying means together constitute a parameter adjustment unit, and wherein there are a plurality of such parameter adjustment units, connected in parallel, each such unit corresponding to a different parameter to be adjusted.

7. In a servomechanism, the servomechanism being connected to control the position of a movable object, the servomechanism being controlled by a command signal, the servomechanism including means for generating a position signal indicative of the measured position of the object, the improvement comprising:

(a) means for sampling the command signal and the position signal, (b) means for generating an error signal proportional to the difference between the command signal and the position signal, the generating means being connected to the sampling means, and (c) means for adjusting only the time advance of the command signal, in response to the error signal, the adjusting means being connected to the generating means, the adjusting means being capable of adjusting the time advance such that the magnitude of the error signal tends to decrease.

8. The improvement of claim 7, wherein the adjusting means includes means for integrating the sampled error signal, the integrating means being connected to receive its input from the sampling means.

9. The improvement of claim 8, wherein the sampling means includes means for sampling the command and position signals at predetermined points in time.

10. In a servomechanism, the servomechanism being connected to control the position of a movable object, the servomechanism being controlled by a command signal, the servomechanism including means for generating a position signal indicative of the measured position of the object, the improvement comprising:

(a) means for sampling the command signal and the position signal, (b) means for generating an error signal proportional to the difference between the command signal and the position signal, the generating means being connected to the sampling means, and (c) means for adjusting a selected parameter of the command signal, in response to the error signal, the adjusting means being connected to the generating means, the adjusting means being capable of adjusting the parameter such that the magnitude of the error signal tends to decrease, wherein the adjusting means includes means for integrating the sampled error signal, the integrating means being connected to receive its input from the sampling means, wherein the sampling means includes means for sampling the command and position signals at predetermined points in time, and further comprising means for activating the sampling means when the first derivative of the command signal is either zero or at an extremum.

11. The improvement of claim 10, further comprising means for adjusting the magnitude of the signal being integrated.

12. A method of automatically varying the command signal of a servomechanism, the servomechanism being connected to control the position of a movable object, comprising the steps of:

(a) sampling the command signal and a signal indicative of the measured position of the object, (b) generating an error signal proportional to the difference between the command signal and the position signal, and (c) adjusting only the time advance of the command signal, according to the value of the error signal, the time advance being adjusted such that the magnitude of the error signal tends to decrease.

13. The method of claim 12, wherein the sampling is done at a plurality of points in time.

14. The method of claim 13, wherein the generating step is followed by the step of selectively inverting the polarity of the error signal.

15. The method of claim 14, wherein the inverting step is performed according to the value of the first derivative of the command signal.

16. The method of claim 12, wherein the adjusting step includes integrating the sampled error signal and varying the parameter according to the integrated error signal.

17. The method of claim 12, wherein all of the enumerated steps are repeated, in the same order, for a plurality of parameters, and wherein the method is performed simultaneously for all of said parameters.

18. A method of automatically correcting a selected parameter of the command signal of a servomechanism, so as to enhance the accuracy of the servomechanism, the servomechanism being connected to control the position of a movable object, the method comprising the steps of:

(a) determining a set of points on the waveform of the command signal at which an error in the selected parameter tends to cause the greatest impairment to the accuracy of the servomechanism, (b) sampling an error signal at the selected set of points, the error signal being proportional to the difference between the command signal and a signal indicative of the position of the object, and (c) applying the sampled error signal as a correction to the selected parameter, the applying step including the step of inverting the error signal, before correcting the parameter, at those sampled points at which such inversion causes the magnitude of the error to be reduced.

19. In a servomechanism, the servomechanism being connected to control the position of a movable object, the servomechanism being controlled by a command signal, the servomechanism including means for generating a position signal indicative of the measured position of the object, the improvement comprising:
  (a) means for sampling the command signal and the position signal,
  (b) means for generating an error signal proportional to the difference between the command signal and the position signal, the generating means being connected to the sampling means,
  (c) means for adjusting a selected parameter of the command signal, in response to the error signal, the adjusting means being connected to the generating means, the adjusting means being capable of adjusting the parameter such that the magnitude of the error signal tends to decrease, and
  (d) means for activating the sampling mens when the first derivative of the command signal is either zero or at an extremum.

20. A method of automatically varying the command signal of a servomechanism, the servomechanism being connected to control the position of a movable object, comprising the steps of:
  (a) sampling the command signal and a signal indicative of the measured position of the object,
  (b) generating an error signal proportional to the difference between the command signal and the position signal, and
  (c) adjusting a selected parameter of the command signal, according to the value of the error signal, the parameter being adjusted such that the magnitude of the error signal tends to decrease,
  wherein the sampling is done at a plurality of points in time, and wherein the sampling step is followed by the step of selectively inverting the polarity of the error signal.

21. The method of claim 20, wherein the inverting step is performed according to the value of the first derivative of the command signal.

* * * * *